(12) United States Patent
Arcese et al.

(10) Patent No.: US 8,522,231 B2
(45) Date of Patent: Aug. 27, 2013

(54) UPDATING A PLURALITY OF COMPUTERS

(75) Inventors: Mauro Arcese, Rome (IT); Gianluca Bernardini, Rome (IT); Michele Crudele, Rome (IT)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 12/865,561

(22) PCT Filed: Jan. 30, 2009

(86) PCT No.: PCT/EP2009/051046
§ 371 (c)(1),
(2), (4) Date: Dec. 6, 2010

(87) PCT Pub. No.: WO2009/095461
PCT Pub. Date: Aug. 6, 2009

(65) Prior Publication Data
US 2011/0093743 A1    Apr. 21, 2011

(30) Foreign Application Priority Data

Jan. 30, 2008 (EP) ..................................... 08150814
Jan. 30, 2008 (EP) ..................................... 08150815

(51) Int. Cl.
*G06F 9/44* (2006.01)

(52) U.S. Cl.
USPC ........... 717/171; 709/219; 717/168; 717/172; 717/174; 726/24

(58) Field of Classification Search
None
See application file for complete search history.

(56) References Cited

U.S. PATENT DOCUMENTS 5,862,325 A    1/1999    Reed et al.
6,625,750 B1 *  9/2003    Duso et al. ...................... 714/11
(Continued)

FOREIGN PATENT DOCUMENTS

EP    1427170 A      6/2004
EP    1575244 A2 *  9/2005
EP    1796341 A      6/2007

OTHER PUBLICATIONS

David Dearman, "It's on my other computer!: computing with multiple devices", 2008, University of Toronto, Toronto, ON, Canada, pp. 767-776, <http://delivery.acm.org/10.1145/1360000/1357177/p767-dearman.pdf>.*

(Continued)

*Primary Examiner* — Thuy Dao
*Assistant Examiner* — Khanh Dang
(74) *Attorney, Agent, or Firm* — Yee & Associates, P.C.; Jeffrey S. LaBaw

(57) ABSTRACT

Updating a plurality of computers is accomplished. A first message is created in an update source, where the first message includes a one or more instructions and an address of a message repository. The first message is transmitted to a first computer using either a Push or a Pull protocol. A second message is transmitted to the first computer using the Push or Pull protocol, the second message comprising data retrieved from the address in the first message. The first computer executes one or more of the instructions in the first message with at least some of the second message. The address in the first message is updated to match the address of the first computer. The updated first message is transmitting to a further one of the computers. Transmission of the second message is repeated to further ones in the plurality of computers until all of the plurality of computers have been updated.

27 Claims, 7 Drawing Sheets

(56) References Cited

U.S. PATENT DOCUMENTS

| | | | |
|---|---|---|---|
| 7,577,721 | B1* | 8/2009 | Chen ............................ 709/219 |
| 8,056,133 | B1* | 11/2011 | Yao et al. ........................ 726/24 |
| 8,413,133 | B2* | 4/2013 | Sakurai et al. ................ 717/171 |
| 2005/0144616 | A1 | 6/2005 | Hammond et al. |
| 2005/0257214 | A1* | 11/2005 | Moshir et al. ................. 717/171 |
| 2007/0050761 | A1* | 3/2007 | Hester et al. .................. 717/168 |
| 2007/0169109 | A1* | 7/2007 | Neswal .......................... 717/174 |
| 2009/0013318 | A1* | 1/2009 | Aderton et al. ............... 717/171 |
| 2009/0138870 | A1* | 5/2009 | Shahindoust et al. ........ 717/172 |
| 2010/0333080 | A1* | 12/2010 | Keys et al. .................... 717/171 |

OTHER PUBLICATIONS

Constantine Sapuntzakis, "Virtual Appliances for Deploying and Maintaining Software", 2003, Stanford University, pp. 1-18, <http://db2.usenix.org/events/lisa03/tech/full_papers/sapuntzakis/sapuntzakis_html/>.*

Krushnaal Pai, "APPOX", 2010, Maharashtra Academy of Engineering, Alandi (D) Pune, India, pp. 391-395, <http://ieeexplore.ieee.org/stamp/stamp.jsp?tp=&arnumber=5564145&tag=1>.*

Segal, M.E., "Dynamically Updating Distributed Software: Supporting Change in Uncertain and Mistrustful Environments", 1989, EECS Department University of Michigan, pp. 254-261, <http://ieeexplore.ieee.org/stamp/stamp.jsp?tp=&arnumber=65219>.*

Sachin Agarwal, et al.: "Gossip Based Streaming with Incentives for Peer Collaboration", Mutimedia, 2006. ISM'06. Eighth IEEE International Symposium ON, IEEE, Dec. 1, 2006, pp. 629-636, XP031041838 ISBN: 978-0-7695-2746-8.

Agarwal et al., "Analysis and Implementation of Gossip-Based P2P Streaming with Distributed Incentive Mechanisms for Peer Cooperation", Hindawi Publishing Corporation, 2007, 12 pages.

* cited by examiner

UPDATING A PLURALITY OF COMPUTERS

TECHNICAL FIELD

The present invention relates to a method and system for updating a plurality of computers, and particularly, but not exclusively a method of updating a plurality of computers that are located remotely to a source of the update.

BACKGROUND

During the past 10 years, Information Technology (IT) infrastructures have experienced significant growth due to the increased availability of distributed computing environments and inexpensive and robust servers. Systems management refers to enterprise-wide administration of distributed computer systems. The main tasks involved in system management include: deployment of new software components; update of software components (e.g., patch management); automation of standard procedures; centralised and delegated control of IT components; and monitoring of IT components; etc. The task of system management is becoming increasingly difficult because of the ever-increasing complexity of today's IT environments and the growing use of pervasive devices (e.g. Personal Digital Assistants (PDAs)). There are a number of enterprise software distribution programs currently available (e.g., International Business Machines' (IBM's) Tivoli Software Distribution program) which enable administrators to install, configure, and update software on networked systems. These software distribution programs can implement "push" (i.e. a reverse client/server or server-initiated) or "pull" (client initiated) procedures to identify non-compliant recipient devices and transmit messages thereto to cause disseminated agents on the recipient devices to execute a distribution command (e.g., installation code), possibly using associated distribution data, and thereby update their software. In a push communication procedure a request for a service is initiated by the service provider. In contrast, in a pull communication procedure, a request for a service is initiated by a requester.

It is an object of the present invention to provide an improved method and system which alleviate the drawbacks of the prior art.

SUMMARY OF THE INVENTION

According to the invention there is a method, system and product of updating a plurality of computers. A first message is created in an update source, where the first message includes a one or more instructions and an address of a message repository. The first message is transmitted to a first computer using either a Push or a Pull protocol. A second message is transmitted to the first computer using the Push or Pull protocol, the second message comprising data retrieved from the address in the first message. The first computer executes one or more of the instructions in the first message with at least some of the second message. The address in the first message is updated to match the address of the first computer. The updated first message is transmitting to a further one of the computers. Transmission of the second message is repeated to further ones in the plurality of computers until substantially all of a pre-defined number of computers have been updated.

BRIEF DESCRIPTION OF THE DRAWINGS

An embodiment of the invention is herein described by way of example only, with reference to the accompanying Figures in which.

DETAILED DESCRIPTION OF THE INVENTION

Figure 1:
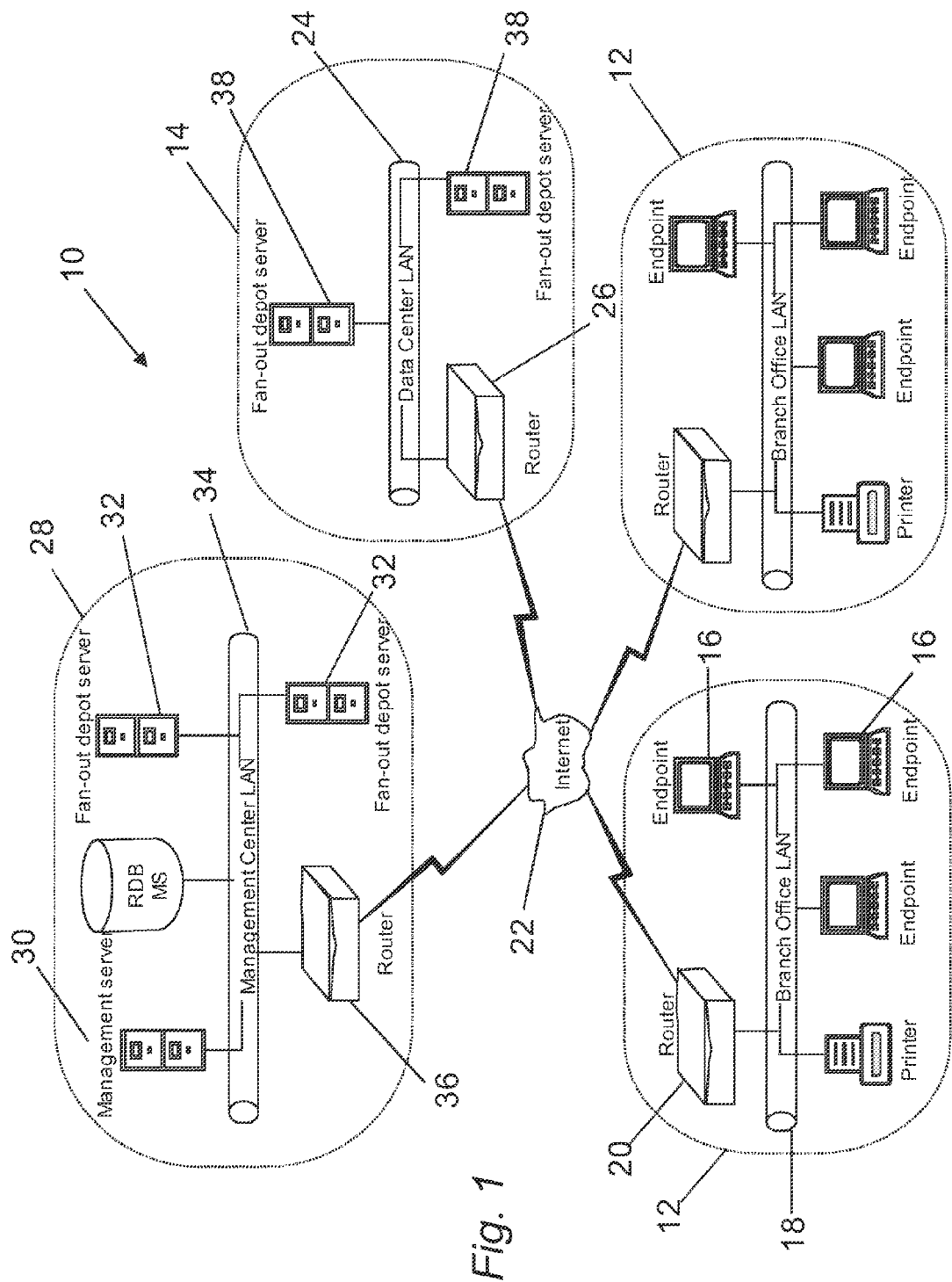
FIG. 1 is a block diagram of an exemplary enterprise network in which the method of the preferred embodiment would operate.

One preferred embodiment addresses the problems of minimizing network traffic over Wide Area Network (WAN) links during a distribution process; with a pull protocol especially when there are no jobs for computers in a branch office; minimizing the use of management software and the need for management servers in branch offices, thereby reducing the operating costs of an enterprise network, since apart from their role in system management, management servers do not typically contribute to the running of a user's everyday business applications and thus, represent an expensive overhead in maintaining an enterprise network;

guaranteeing scalability, reliability, high availability and resilience; and managing powered-off endpoint computers through a Wake-On-LAN (WOL) protocol (Local Area Network (LAN).

More particularly, compared with a traditional per target distribution paradigm, a preferred embodiment avoids the need for a fan-out depot inside a branch office, since the preferred embodiment enables a first endpoint computer to:

acquire a distribution document (containing links to a repository of relevant distribution data);

download the relevant distribution data over a WAN link; and provide other endpoint computers in the same branch office with the relevant commands and distribution data.

One preferred embodiment employs a two-way gossip protocol, which enables the status of the distribution process to be propagated to all of the endpoint computers in the branch office. More particularly, the preferred embodiment provides for the inclusion of a distribution status document in each endpoint computer in a branch office. The distribution status document effectively details the status (has/has not received distribution commands etc.) of each endpoint computer (in the branch office) to which the user has specified the distribution should occur. An endpoint computer is allowed (at any stage in the gossip protocol) to update its distribution status document to reflect the changes in its own status (or the status of other endpoint computers in the branch office). This approach has several benefits including:

enhancing the performance and scalability of the distribution process, because a management system can determine the status of the distribution in an entire branch office by a communication with a single endpoint computer therein (which, in turn, simplifies the management center protocol)

strengthening the distribution process against failures of individual endpoint computers (since a management center can determine the status of the distribution from the other endpoint computers).

One preferred embodiment allows a distribution document to be resent to endpoint computers in which, for one reason or another, the distribution process has failed. Thus, any endpoint computers that failed to download the required distribution data, will have other chances to acquire the distribution document (and its links to another repository for the distribution data) from other endpoint computers participating in the gossip protocol. This adds resilience and robustness to the distribution process to enable it to withstand single failures without intervention of the management center.

Furthermore, as part of the gossip protocol of the preferred embodiment, a dormant endpoint computer can be awakened by a WOL packet, without intervention of the management center (i.e. since the endpoint computers are in the same LAN, there will be no problems of WOL packages crossing subnetwork boundaries).

On another note, one preferred embodiment is robust to distribution loss, and transient network disruptions. Finally, the preferred embodiment allows the use of simple and lightweight management centers, since the management center has a much smaller role in implementing the distribution process (i.e. since most of the communication in the distribution process is managed inside a branch office by peer endpoint computers). In particular, in its simplest implementation with a Push protocol, a management center need only send a distribution document to a randomly selected endpoint computer and wait for results (from the selected endpoint computer) detailing the status of the distribution process.

One preferred embodiment, in its pull protocol implementation, solves one problem of a conventional pull communication protocol which is that each endpoint computer polls a management centre over slow and unreliable WAN links (unless an intermediate manager, or caching server is located in the branch office) generating useless traffic most of the time. The preferred embodiment drastically reduces this traffic since in addition to propagating a distribution document to an entire branch office, an endpoint computer also informs the relevant endpoint computers when there are no distribution jobs therefor. This enables endpoint computers to reset their polling timeout to the next polling interval, so that at steady state, only one endpoint computer polls the management centre for jobs. Having reduced the traffic generated by useless polls, the polling interval can be shortened, thereby making it easier to provide immediate distributions.

Another advantage of one preferred embodiment in its Pull protocol implementation is its resilience and robustness, since there is no single point of failure. In particular, if an endpoint crashes, another endpoint computer will collect the failure in the gossip session and notify the management centre in a Distribution Results Document. In a traditional gossip system, if more than one endpoint polls a management centre for the same distribution document, a gossip session is initiated. However, in the preferred embodiment, gossip sessions are identified by a distribution ID code so that at some point, they may be joined in a single session.

1. Typical Enterprise Network Environment

Referring to FIG. 1, an exemplary enterprise network 10 can be divided into a plurality of interconnected branch offices and data centers 14. A branch office 12 comprises a plurality of endpoint computers 16 connected together through a branch office LAN 18; wherein the branch office LANs 18 are themselves connected through routers 20 to the Internet 22. A data center 14 typically comprises a plurality of data center servers which run the applications (e.g., middleware) that handle the core business and operational data of the enterprise. The data center servers are connected together through a data center LAN 24; wherein the data center LANs 24 are themselves connected to the Internet 22 through routers 26.

The enterprise network 10 is typically managed by a distributed software application known as a management system. A management system typically comprises a management center 28, a plurality of fan-out depot servers and a plurality of management system agents. The management center 28 typically comprises a management server 30 and one or more fan-out depot servers 32. The management server 30 provides interfaces (e.g., application interface (API), graphical user interface (GUI), command line, etc.) for administering the entire management system and for managing one or more of the endpoint computers 16. The management server 30 and fan-out depot servers 32 are connected to each other through a management center LAN 34, which is connected in turn to the Internet 22 through a router 36. A management system may also include intermediate management centers for better scalability. Similarly, the management system may be capable of network segment traversal. One or more of the enterprise network data centers 14 may be configured to include fan-out depot servers 38 (connected to the data center LANs 24). One or more of the fan-out depot servers 38 are configured to host management system agents, wherein these agents are software components that are responsible for receiving and performing management actions (e.g., software installation, inventory data collection, operating system monitoring, etc.) in endpoint computers 16. To this end, a management system agent is typically installed on each of the endpoint computers 16 in a branch office 12.

Unfortunately, branch offices 12 are often located remotely to the management center 28 (and the data centers 14 housing the fan-out depot servers 38). To further aggravate the situation, the branch offices 12 are often connected to the management center 28 through, slow and unreliable, wide area network (WAN) links. Indeed, branch offices 12 are often disconnected from the management center 28. Data centers 14 may also be located remotely to the management center 28. However, in contrast with the branch offices 12, the data centers 14 are typically connected to the management center 28 through reliable WAN/LAN links. In addition to software and data distribution, hardware and software inventories are performed on end-point computers, as are other tasks which are delivered and executed on these computers.

This architecture leads to difficulties in disseminating distribution commands and associated distribution data to branch offices and data centers. A distribution command relates to any management action (initiated from the management server), that must be performed by the management system agents (e.g., software installation, inventory data collection, upload of a data file from a managed computer to the management system). For example, a distribution command could be to invoke msiexec (which is a native Windows command used to install a software on windows platforms); or a task internally supported by agent code like "change configuration parameter x to y". Distribution Commands are described in a distribution document. Thus, distribution commands are deployed to clients in distribution documents.

A distribution document contains information needed to perform a command (e.g., install software; run a program to remedy a problem on a client computer, etc.). In general, a distribution document fully describes the operation that an agent code must perform. Distribution documents are typically small in size, making them particularly suitable for exchange in a gossip session.

Distribution data is any data that is not contained in a distribution document and that might be required to execute a distribution command (e.g., software installation often requires software images to be deployed to endpoint computers and deleted therefrom when the installation is complete) in a distribution document. For example, to execute msiexec it is not necessary to download msiexec.exe because it is already on client computers. In contrast, ciccio.exe must be downloaded before it can be executed, because it is not in the client computer, nor is it a part of the operating system of the agent code. Fan-out distribution refers to the process of downloading distribution data from fan-out depot servers to endpoint computers. A distribution document describes a list of fan-out depot servers which contain distribution data and that can be contacted by the agent code for download.

2. Problems with Conventional Distribution Procedures

Modern approaches to solving the fan-out distribution problem include:

(i) Installing a Depot Server in a Branch Office

In this approach, the depot server receives bulk data and distributes it to the endpoint computers. However, this requires the deployment and maintenance of management servers in branch offices.

(ii) Enabling Peering Capabilities in Agent Software

Figure 2:
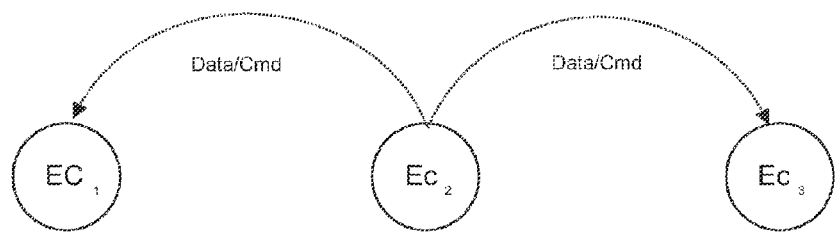
FIG. 2 is a block diagram of an information flow in a prior art peering distribution process.

Referring to FIG. 2, in this approach, an endpoint computer (EC) can become the source of distribution commands and distribution data for other endpoint computers (EC) in the branch office. This has the advantage of limiting the traffic on the WAN links (between the endpoint computers and the management center) because comparatively few endpoint computers effectively acquire their distribution data from outside the branch offices (since the other endpoint computers acquire the distribution commands and distribution data from their peers in the branch office).

(iii) Polling

Figure 3:
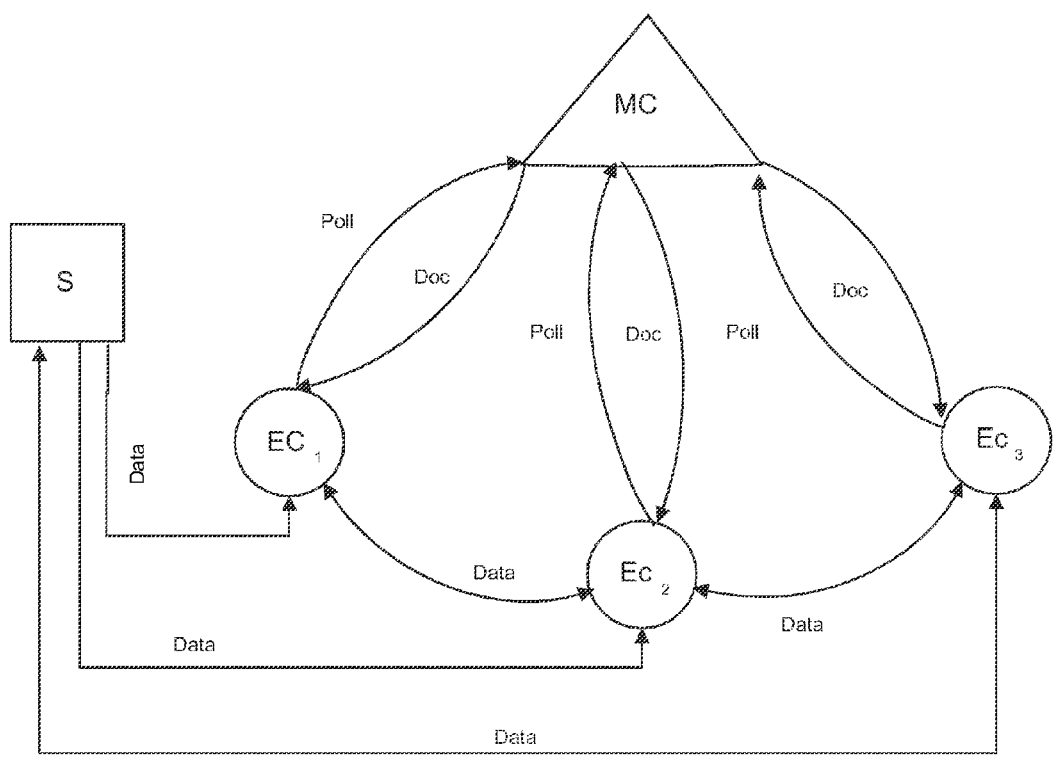
FIG. 3 is a block diagram of an information flow in a prior art polling distribution process.

A polling paradigm has been recently used to achieve scalability in large-scale distributed environments. Referring to FIG. 3, in this approach, endpoint computers EC1-EC3 periodically poll the management center (MC) (or some intermediate cache servers) to acquire distribution documents.

On receipt of the distribution documents, the endpoint computers EC1-EC3 contact a designated repository S for the relevant distribution data. This approach is the opposite of a push paradigm, wherein the management center MC effectively pushes the distribution documents to target endpoint computers EC1-EC3.

The polling paradigm allows scalable infrastructures to be implemented because the distribution load is spread across the management center MC and depot servers S. In particular, the polling paradigm ensures that all of the endpoint computers EC do not contact the management center MC at the same time, because the polling process is randomly distributed over time. While pull-based technology makes system management products more scalable and firewall-friendly than those based on push technology, nonetheless, it has a number of limitations that make it difficult to minimize network traffic and the use of management software in branch offices. In particular, because of the polling interval of the polling paradigm, it is difficult to immediately deliver a distribution document to endpoint computers. This facility is important for the installation of emergency security patches.

Similarly, whilst each endpoint computer polls a management center for distribution documents, since distribution documents are only periodically deployed, the endpoint computers rarely receive distribution jobs in response to their polls. Thus, most of the network traffic generated by polling is useless. Furthermore, users tend to shorten polling periods (in an effort to achieve "near" immediate distributions), thereby increasing polling traffic. A possible solution to this problem would be to install a caching server in branch offices. However, this would counter the aim of a reducing management apparatus in branch offices.

Furthermore, the push and polling paradigms have a fundamental limitation, namely a distribution document per target limit. In these prior art approaches a first computer which acquires distribution data from outside the branch office (from the depot server) will cache the data. Similarly, when another computer in the branch office acquires a distribution document, it will first try to get distribution data from a peer computer, and then from a depot server. Thus, all the endpoint computers effectively get their distribution documents from a management server. In other words, peering is not applied to the distribution commands to be executed but only to the distribution data that are needed to execute the distribution commands.

Accordingly, network traffic over slow links is only reduced for distribution data, since distribution documents still traverse WAN links for each target endpoint computer EC1-EC3 in a branch office. This problem is emphasized with the polling paradigm, wherein network traffic over WAN links is increased (as compared with the push paradigm), because each endpoint computer EC1-EC3 polls outside of the branch office (i.e. to the management center MC) for distribution commands and distribution data. On another note, with the polling paradigm it is impossible to send software and/or to a powered-off endpoint computer. In contrast, the push paradigm allows a dormant endpoint computer to be activated with a WOL packet.

3. Overview of the Preferred Embodiment

The preferred embodiment overcomes the above-mentioned problems with the distribution document per target paradigm by using a distribution document per branch office paradigm. In particular, the preferred embodiment addresses an entire branch office or a subset of endpoint computers therein, rather than its individual endpoint computers.

The preferred embodiment uses a gossip protocol, which is a computer-to-computer communication protocol inspired by the form of gossip seen in social networks (Agrawal et al., Advances in Multimedia 2007 (2007), Article ID 84150). More particularly, a gossip protocol is a protocol designed to mimic the way that information spreads when people gossip about something. For example, in a push gossip protocol a node communicates information to another node. In a human analogy, suppose that I know something and I am sitting next to Jim. If I tell Jim about that the topic, then two of us know about it. If later on, Jim tells John about the topic and I tell another person Mike about it, then four of us know about it; and so the information is disseminated rapidly through a group of people. A gossip protocol is said to be a pull gossip protocol if a node asks an information from another node. Finally, a gossip protocol is said to be push and pull gossip protocol, if it exhibits both of the above behaviors. In particular, a gossip protocol is said to be push and pull protocol when two nodes exchange information in an interactive fashion. For simplicity, a node which transmits information to another node, will be known henceforth as a gossiping node. Similarly, a node which receives the information will be known as a gossiped node.

In view of the present distribution application, a group of endpoint computers to whom a distribution is to be conducted, will be known henceforth as a distribution population.

It will be understood, that a user may wish to select the members of a given distribution population by other criteria than their location. For example, a user may wish to perform a particular distribution operation on endpoint computers running a particular version of a software product, wherein the endpoint computers are located in different branch offices.

4. Push Paradigm Implementation of Preferred Embodiment

Figure 4:
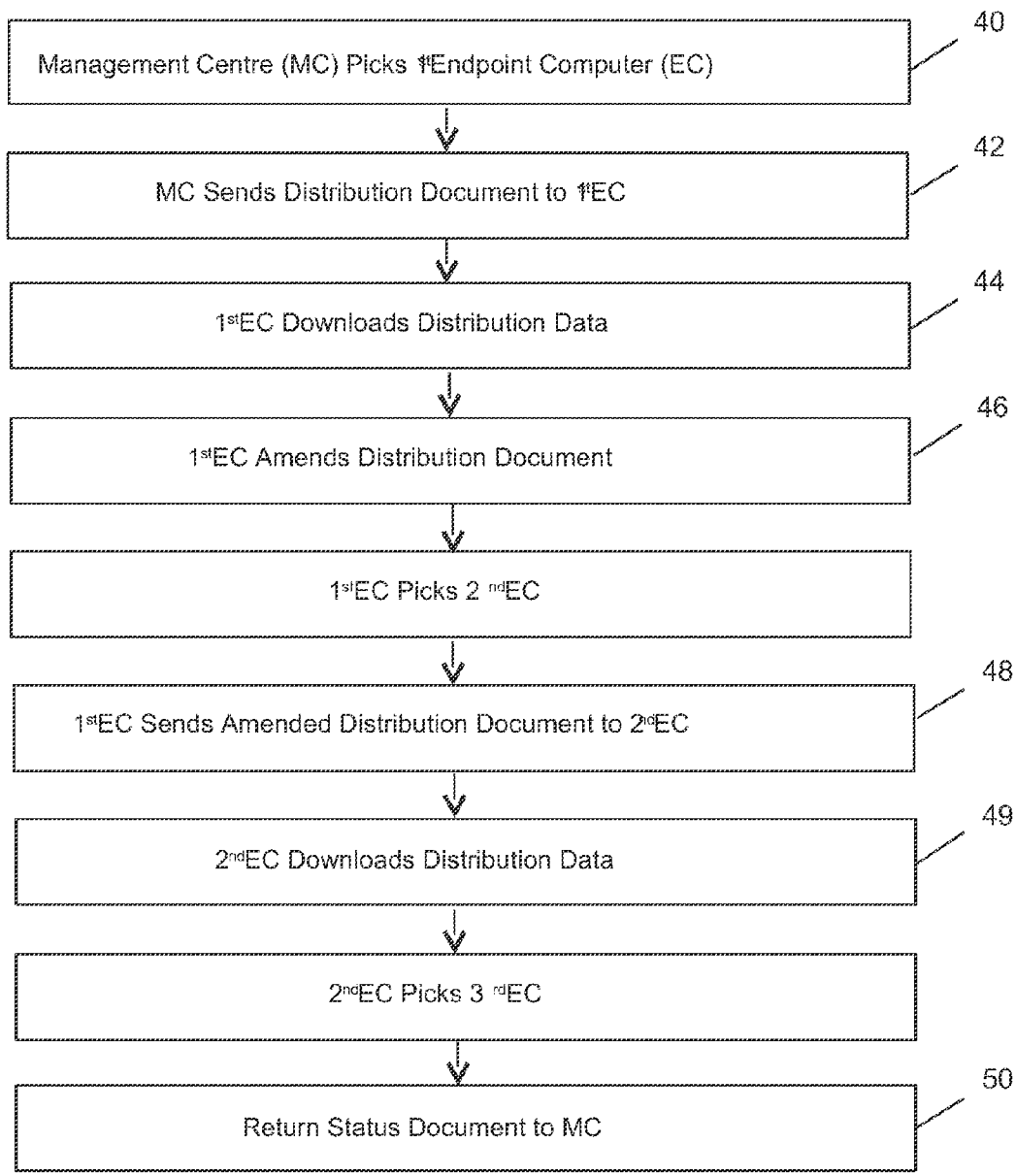
FIG. 4 is a flowchart of the method of the preferred embodiment.
Figure 5:
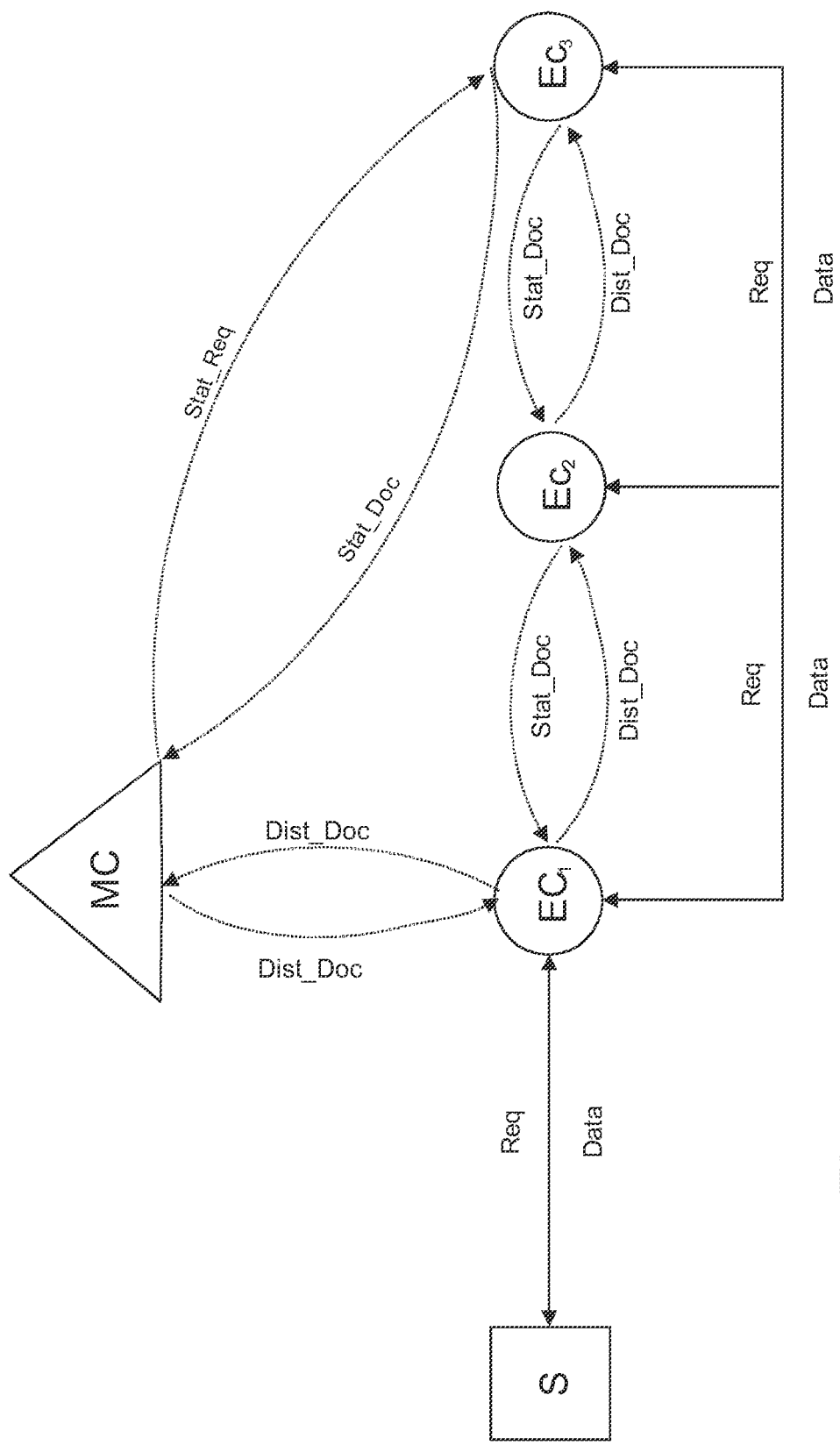
FIG. 5 is a block diagram of an information flow in the Push paradigm implementation of the preferred embodiment.

Referring to FIG. 4 and FIG. 5 in combination, a simplified example of a fan-out distribution using the push paradigm comprises the steps of:

(a) the management center partitioning a population distribution into a plurality of segments, wherein each segment corresponds with the members of a single branch office;

(b) the management center (MC) selecting 40 a first endpoint computer (EC1) in a given segment;

(c) the management center (MC) transmitting 42 a distribution document (Dist_Doc) to the first endpoint computer (EC1) wherein the distribution document (Dist_Doc) describes:

the other endpoint computers (EC2, EC3) in the same segment; the distribution command to be executed in the endpoint computers (e.g., software installation, inventory collection); and a Uniform Resource Locator (URL) of the repository (S) for the relevant distribution data (e.g., fan-out depot server);

d) the first endpoint computer (EC1) returning a distribution status document (Stat_Doc) to the source computer (i.e. the management center in this case) indicating whether the download was successful;

(e) the first endpoint computer (EC1) contacting (Req) the designated repository (S) (using the fan-out URL from the distribution document [Dist_Doc]) and downloading 44 the distribution data (Data) therefrom; and simultaneously initiating a push and pull gossip protocol session with other endpoint computers (EC2, EC3) in the segment by:

(1) amending 46 the distribution document (Dist_Doc) to add its own URL as the source for the distribution data (Data) so peer computers will download data from it rather than going out of the branch office (this ensures robustness because if the source client computer crashes, there are other sources of data indicated in the distribution document and only in that case will a client computer go out of its branch office to acquire data);

(2) randomly selecting a second endpoint computer (EC2) in the segment; and (3) sending 48 the amended distribution document (Dist_Doc) and its distribution status document (Stat_Doc) to the second endpoint computer (EC2);

(f) a management system agent in the first endpoint computer (EC1) executing the distribution command(s);

(g) the second endpoint computer (EC2) updating its distribution status document (Stat_Doc) to reflect the distribution status document (Stat_Doc) received from the first endpoint computer (EC1);

(h) the second endpoint computer (EC2) returning a distribution status document (Stat_Doc) to the first endpoint computer (EC1) indicating the success, or otherwise of the download operation;

(i) the first endpoint computer (EC1) updating its distribution status document (Stat_Doc) to reflect the distribution status document (Stat_Doc) received from the second endpoint computer (EC2);

(j) the second endpoint computer (EC2) contacting (Req) the first endpoint computer (EC1) and downloading 49 therefrom distribution data (Data), whilst simultaneously amending the distribution document (Dist_Doc) to add its own URL as the source for the distribution data (Data); and sending the amended distribution document (Dist_Doc) to a third endpoint computer (EC3) in the segment, in a similar fashion to step (e); and (k) a management system agent in the second endpoint computer (EC2) executing the distribution commands.

The above download and document exchange process is continued for several iterations until an endpoint computer receives distribution status document (Stat_Doc) indicating a final status condition (e.g. success, failure, endpoint computer unavailable). At this point, the relevant endpoint computer returns 50 a distribution status document (Stat_Doc) indicating the status condition to the management center (MC). The management center (MC) reviews the distribution status document (Stat_Doc) to determine whether the distribution data (Data) have been deployed to all of the members of the branch office. If so, the distribution operation is deemed to have been completed for the branch office; and the management center (MC) selects another segment of the distribution population and re-starts the distribution process therein. However, if the distribution data (Data) have not been deployed to all of the members of the branch office, the management center (MC) selects another candidate endpoint computer and re-transmits the original distribution document (Dist_Doc) (listing the URL of the repository as the source of the distribution data) thereto.

In another implementation, on receipt (by an endpoint computer) of a distribution status document (Stat_Doc) indicating an error condition, the endpoint computer reviews the nature of the error condition. In particular, if the distribution status document (Stat_Doc) indicates that all the endpoint computers in the segment received distribution data (Data), the endpoint computer will stop the gossip session and return the relevant distribution status document (Stat_Doc) to the management center (MC). Otherwise, the endpoint computer is switched to a dormant state and reawakened after a predefined time interval to randomly select another endpoint computer and transmit its distribution status document (Stat_Doc) and distribution document (Dist_Doc) thereto.

In addition, the management center (MC) may directly interrogate an endpoint computer to determine the status of the distribution operation, since because of the two-way nature of the gossip protocol, the distribution status document (Stat_Doc) in each endpoint computer essentially details the status of each of the other endpoint computers in their branch office.

In one possible implementation of this interrogation procedure, the management center (MC) switches to an inactive state after transmitting the distribution document (Dist_Doc) (listing the URL of the repository (S) as the source of distribution data (Data) to the selected first endpoint computer. The management center (MC) is then periodically reactivated, to interrogate the first endpoint computer and thereby determine the extent to which the required distribution process has been completed. If after a pre-defined period of time:

the distribution data (Data) have not been deployed to all of the endpoint computers in the branch office; or there has not been a significant change in the number of endpoint computers to which the distribution data (Data) have been deployed;

the management center (MC) restarts the distribution process as discussed above. By restarting the distribution process in this fashion, the preferred embodiment ensures that the distribution data (Data) propagate through a branch office regardless of endpoint computer failures.

In yet another embodiment, a management center (MC) does not wait for the receipt of a distribution status document indicating an error condition before restarting the distribution process. Instead, the management center periodically wakes from a dormant state and automatically restarts the distribution process. In this embodiment, the endpoint computers do not themselves advise the management center of the success so far of the distribution process. Instead, the management center itself automatically acquires the results on receipt of a distribution status document (Stat_Doc) on restarting the distribution process.

5. Pull Paradigm Implementation of Preferred Embodiment

Figure 7:
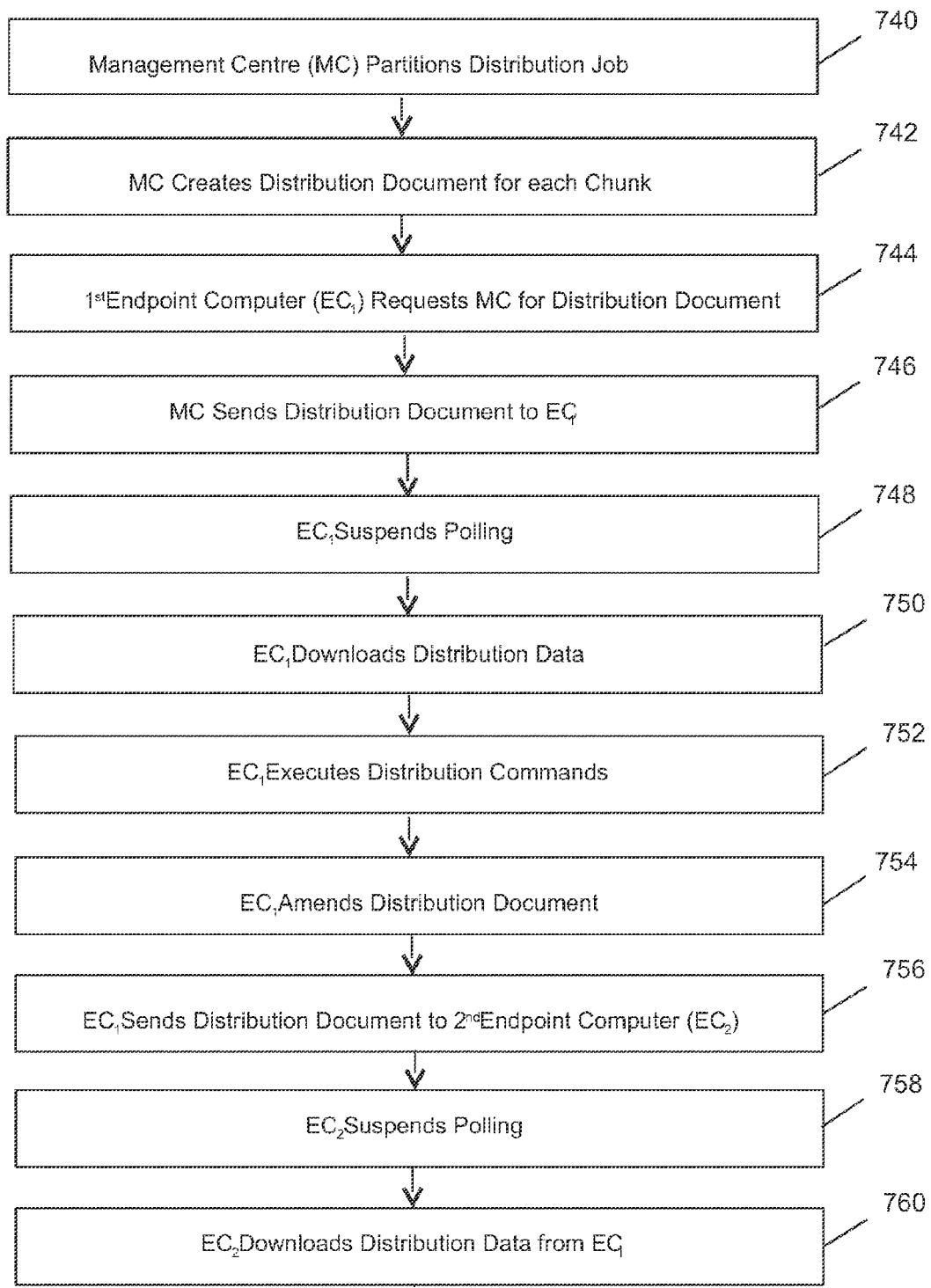
FIG. 7 is a flowchart of the method of the Pull paradigm implementation of the preferred embodiment.
Figure 8:
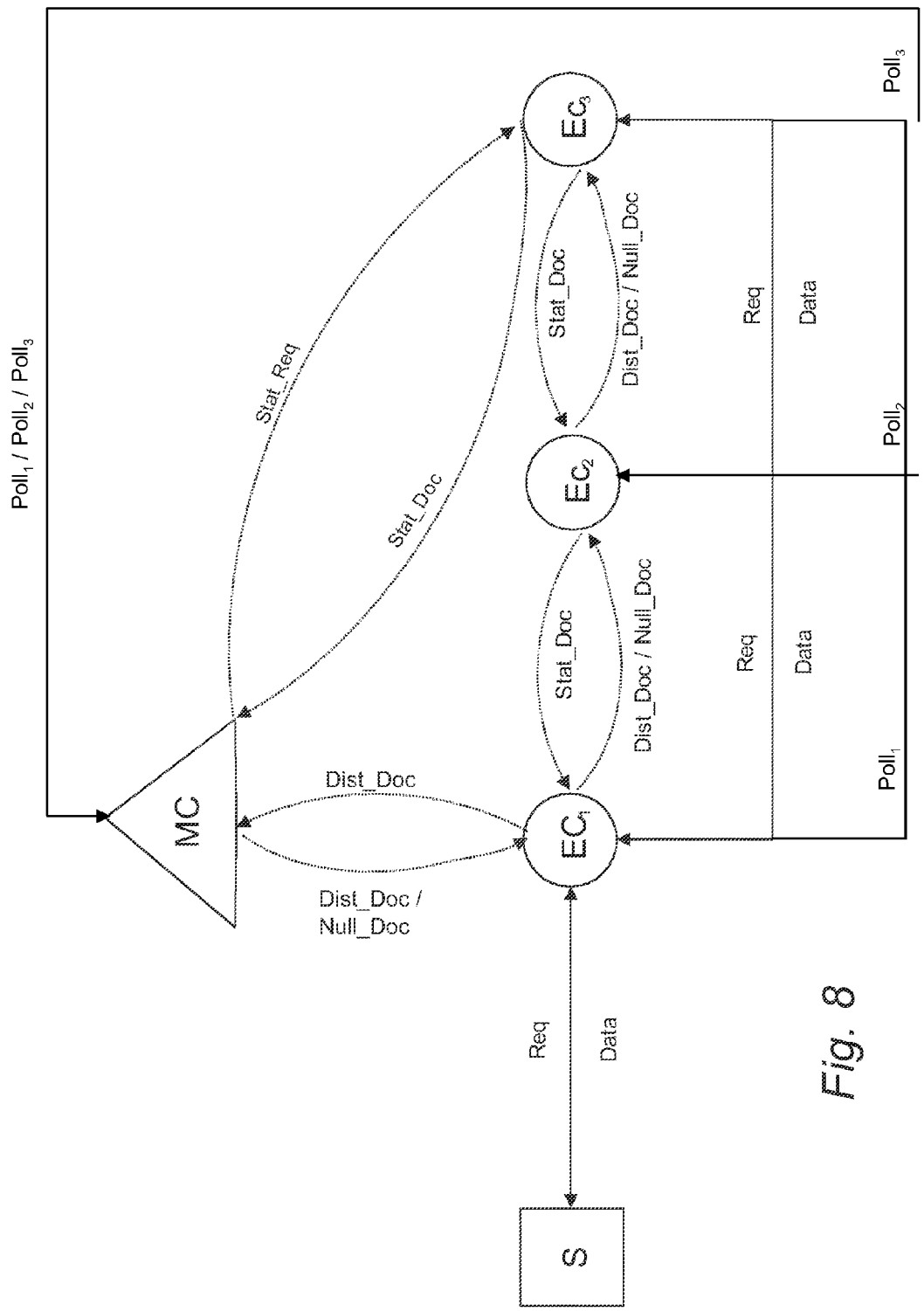
FIG. 8 is a block diagram of an information flow in the Pull paradigm implementation of the preferred embodiment.

In essence, the method of the preferred embodiment involves a management centre publishing a distribution document for each branch office; and a first endpoint computer polling the management centre for distribution documents and propagating the information to the entire branch office. Referring to FIGS. 7 and 8, an implementation of the preferred embodiment comprises the steps of:

(a) endpoint computers (EC1, EC2, EC3) periodically polling (POLL1, POLL2, POLL3) the management centre (MC) for jobs to do (the polling times of the endpoint computers being uniformly distributed in a polling interval, to spread the load on the management centre (MC));

(b) the management centre (MC) partitioning 740 a distribution job into a plurality of segments;

(c) the management centre (MC) creating 742 a distribution document (Dist_Doc) for each segment, wherein the distribution document (Dist_Doc) describes:
  endpoint computers (EC1, EC2, EC3) in the segment;
  distribution commands to be executed in the endpoint computers (e.g., software installation, inventory collection); and
  a URL of the repository (S) for associated distribution data (e.g., fan-out depot server).

(d) a first endpoint computer (EC1) contacting the management centre (MC) and requesting 744 a distribution document (Dist_Doc);

(e) the management centre (MC) transmitting 746 the distribution document (Dist_Doc) to the first endpoint computer (EC1);

(f) the first endpoint computer (EC1) suspending 748 its polling of the management centre (MC) for the duration of its distribution operation; and (g) the first endpoint computer (EC1) contacting (Req) the designated repository (S) (using the fan-out depot URL from the distribution document ((Dist_Doc)) and downloading 750 the distribution data (Data) therefrom; and simultaneously initiating a push and pull gossip protocol session with other endpoint computers (EC2, EC3) in the segment by:
  (1) amending 754 the distribution document (Dist_Doc) to add its own URL as the source for distribution data (Data), so peer computers will download data from it rather than going out of the branch office;
  (2) randomly selecting a second endpoint computer (EC2, EC3) in the segment; and
  (3) sending 756 the amended distribution document (Dist_Doc) and the distribution status document (Stat_Doc) to the second endpoint computer (EC2);

(h) a management system agent in the first endpoint computer (EC1) executing the distribution command(s);

(i) the second endpoint computer (EC2) suspending 758 its polling of the management centre (MC) for the duration of its distribution operation;

(j) the second endpoint computer (EC2) contacting the first endpoint computer (EC1) and downloading 760 distribution data (Data) therefrom; and simultaneously initiating another iteration of the gossip session, using steps (g)(1) to (g)(3);

(k) the second endpoint computer (EC2) updating its distribution status document (Stat_Doc) to reflect the distribution status document (Stat_Doc) received from the first endpoint computer (EC1);

(l) a management system agent in the second endpoint computer (EC2) executing the distribution commands; and (m) the second endpoint computer (EC2) returning a distribution status document (Stat_Doc) to the first endpoint computer (EC1) indicating the success, or otherwise of the download operation; and (n) the first endpoint computer (EC1) updating its distribution status document (Stat_Doc) to reflect the distribution status document (Stat_Doc) received from the second endpoint computer (EC2).

At each stage in the gossip session, the endpoint computers receive copies of updated distribution status documents, (which provide information on the status of download process in the individual endpoint computers in the branch office). Accordingly, a given distribution status document provides a detailed overview of the status of the distribution operation in the branch office at a given time. An endpoint computer stops gossiping when it receives a distribution status document indicating a final status condition (e.g., success, failure, endpoint computer unavailable). The relevant endpoint computer then returns a distribution result document to the management centre (MC). If the required distribution is not complete, the endpoint computer requests a new distribution document from the management centre (MC). It should be noted that with this approach, the management centre does not receive information regarding the success of the distribution process, until the occurrence of an final status condition. Accordingly, this approach does not allow the management centre (MC) to report and track the progress of the distribution operation. However, in an alternative implementation, an endpoint computer is configured to gossip a distribution status document to the management centre (MC) in addition to their endpoint computer gossip partner.

In the event that no distribution document has been assigned to a branch office, an endpoint computer polling a management centre (MC) for a distribution document receives a Null Distribution Document, which lists the endpoint computers in the branch office. This information is useful, because in its absence, an endpoint computer would have no way of knowing the details of other endpoint computers in the branch office. On receipt of a Null Distribution Document, an endpoint computer initiates a push & pull gossip protocol session with the other endpoint computers in the branch office, passing the Null Distribution Document therebetween. A recipient endpoint computer resets its polling timeout choosing a random number (N) in the interval [T0+Dt; T0+2*Dt], wherein Dt=polling interval and T0=the present time. An endpoint computer stops gossiping when it receives feedback from all of the endpoint computers in the branch office (apart from unavailable endpoint computers).

Thus, in summary, a management centre (MC) transmits a distribution document to an endpoint computer (or a Null distribution document if there is no operation queued for the branch office). Similarly, an endpoint computer transmits a distribution result document to the management centre (MC).

An endpoint computer polls the management centre:
  (a) when a polling timeout occurs (i.e. the endpoint computer was idle); or
  (b) at the end of a distribution process, (when the endpoint computer collects the final distribution result document and needs to transmit it back to the management centre). After a polling session, an endpoint computer initiates a gossip session in the branch office during which propagates a new distribution document, or propagates a null distribution document, (whose effect is to reset the polling time of other endpoint computers as explained above). In both cases, an endpoint computer informs its peers if it transmits a last distribution result document to the management centre.

6. Generic Computer Structure

Figure 6:
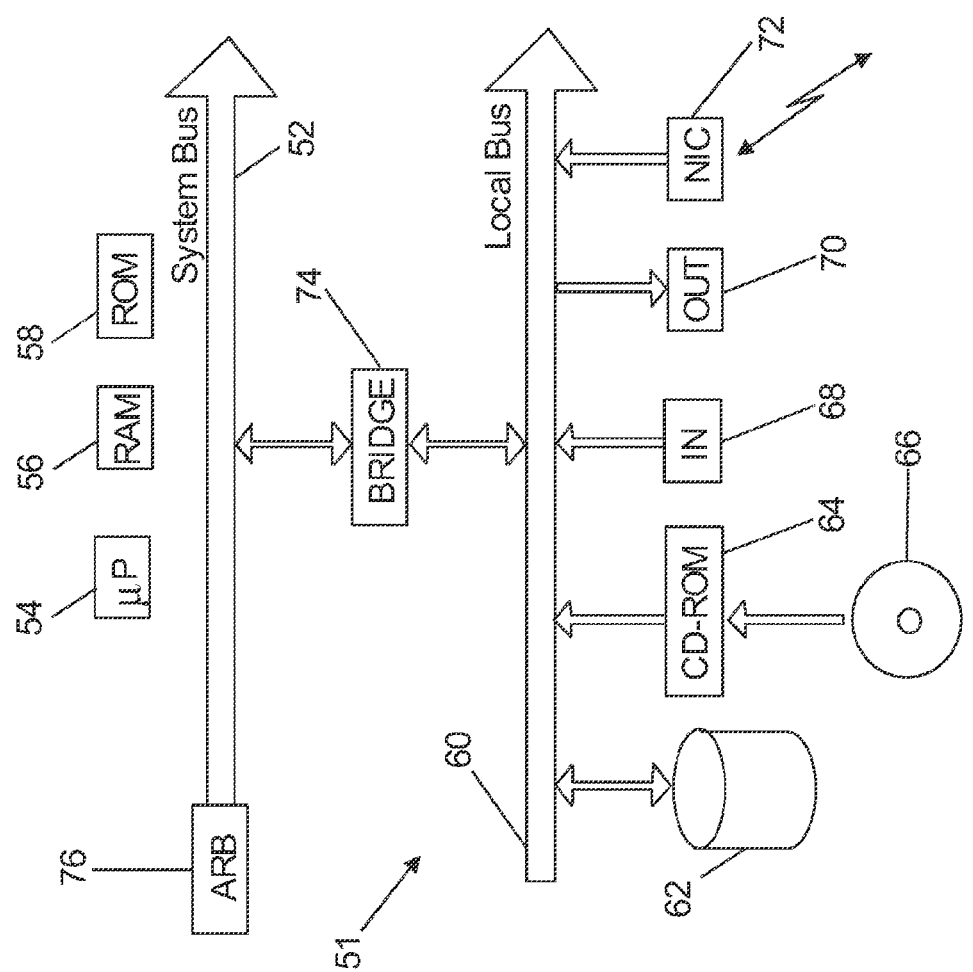
FIG. 6 is a schematic diagram of a computer system adapted to support the preferred embodiment.

Referring to FIG. 6, a generic computer system 51 adapted to support the preferred embodiments is formed by several units that are connected in parallel to a system bus 52. In detail, one or more microprocessors (1P) 54 control operation of the computer 51; a random access memory (RAM) 56 is directly used as a working memory by the microprocessors 54, and a ROM 58 stores basic code for a bootstrap of the computer 51. Peripheral units are clustered around a local bus 60 (by means of respective interfaces). Particularly, a mass memory consists of a hard-disk 62 and a drive 64 for reading compact disks-read only memory (CD-ROMs) 66. Moreover, the computer 51 includes input devices 68 (for example, a keyboard and a mouse), and output devices 70 (for example, a monitor and a printer). A Network Interface Card (NIC) 72 is used to connect the computer 51 to the network. A bridge unit 74 interfaces the system bus 52 with the local bus 60. Each microprocessor 54 and the bridge unit 74 can operate as master agents requesting an access to the system bus 52 for transmitting information. An arbiter 76 manages the granting of the access with mutual exclusion to the system bus 52.

Similar considerations apply if the system has a different topology, or it is based on other networks. Alternatively, the computers have a different structure, include equivalent units, or consist of other data processing entities (such as PDAs, mobile phones, and the like).

Alterations and modifications may be made to the above without departing from the scope of the invention.

The invention claimed is:

1. A method of updating a plurality of computers, the method comprising:
    partitioning, by a management center, a population distribution into a plurality of segments, wherein each segment corresponds with members of a branch office;
    selecting randomly a first computer in the branch office, wherein the branch office comprises the plurality of computers, the plurality of computers are connected by a local area network, and an update source is connected to the branch office by an Internet connection;
    creating in the update source, a first message comprising one or more instructions identifying the plurality of computers in the branch office, and an address of a message repository;
    transmitting the first message to the first computer using a Push or a Pull protocol;
    transmitting a second message to the first computer using the Push or Pull protocol, the second message comprising an update data, the update data retrieved from the address in the first message;
    executing in the first computer, one or more of the instructions in the first message with regard to the update data;
    updating the address in the first message to match the address of the first computer;
    transmitting an updated first message to a randomly selected un-updated computer in the plurality of computers, wherein the randomly selected un-updated computer retrieves the update data from the first computer;
    repeating transmission of the second message to randomly selected un-updated computers in the plurality of computers, each transmission performed by a most recently updated computer until all of the plurality of computers have been updated, wherein the executing and updating are accomplished by an un-updated computer retrieving the update data from an address in the currently updated first message received from the most recently updated computer; and
    responsive to all computers of the plurality of computers having been updated, returning, by a last computer to be updated, a distribution status document indicating an update status of the plurality of computers to the update source.

2. The method of claim 1 wherein:
    transmitting the first message to the first computer is accomplished using the Push protocol and comprises transmitting the first message from the update source to the first computer; and,
    transmitting the second message to the first computer is accomplished using the Push protocol and comprises transmitting the second message comprising data from the address in the first message to the first computer.

3. The method as claimed in claim 1 further comprising:
    notifying other computers of a success of transmitting the second message.

4. The method as claimed in claim 1 further comprising:
    notifying other computers of a success of the first computer retrieving the second message.

5. The method as claimed in claim 1 further comprising:
    obtaining the identities of the plurality of computers to be updated; and
    partitioning the plurality of computers to be updated into one or more groups of computers according to their physical proximity or network connectivity.

6. The method as claimed in claim 1 further comprising:
    notifying the update source of a success of transmission of the second message during a first iteration of the method.

7. The method as claimed in claim 1 further comprising:
    executing one or more instructions in the first message by an agent in the first computer.

8. The method as claimed in claim 1 further comprising:
    transmitting an error message to the update source in the event of a failure.

9. The method as claimed in claim 1 further comprising:
    determining whether all of the plurality of computers have been updated; and
    re-transmitting the first message from the update source to another one of the computers, in the event that all of the plurality of computers have not been updated.

10. The method as claimed in claim 9 further comprising:
    switching the update source to a dormant state for a predefined period of time; and
    awakening the update source before re-transmitting the first message.

11. The method as claimed in claim 1 further comprising:
    re-transmitting the first message from the update source to another one of the computers at regular intervals.

12. The method as claimed in claim 5 further comprising:
    determining whether all of the plurality of computers in the group have been updated; and
    performing the method on the computers in another one of the groups in the event that all of the plurality of computers in the group have been updated.

13. The method as claimed in claim 1, further comprising:
    transmitting the second message and simultaneously updating the address in the first message.

14. The method as claimed in claim 1 further comprising:
    switching the update source to a dormant state; and
    awakening the update source at intervals to interrogate one of the computers to determine a status of the updating.

15. The method as claimed in claim 2 wherein transmitting a request message from any individual computer from the plurality of computers comprises substantially uniformly distributing periods for transmitting the request messages over a predefined polling interval.

16. The method as claimed in claim 15, further comprising:
responsive to determining that a first message has not been created, creating a list message comprising a list of the plurality of computers; and
transmitting the list message to a first one of the computers on receipt of the request message by the update source.

17. A system for updating a plurality of computers, comprising:
one or more processors, one or more non-transitory computer readable storage mediums, and one or more computer readable memories:
computer program instructions stored on at least one non-transitory computer readable storage medium for execution by at least one processor via at least one computer readable memory for selecting randomly a first computer in a branch office, wherein the branch office comprises the plurality of computers, the plurality of computers are connected by a local area network, and an update source is connected to the branch office by an Internet connection;
computer program instructions stored on at least one non-transitory computer readable storage medium for execution by at least one processor via at least one computer readable memory for creating in the update source, a first message comprising a one or more instructions identifying the plurality of computers in the branch office, and an address of a message repository;
computer program instructions stored on at least one non-transitory computer readable storage medium for execution by at least one processor via at least one computer readable memory for transmitting the updated first message to a randomly selected un-updated computer in the plurality of computers, wherein the randomly selected un-updated computer retrieves the update data from the first computer;
computer program instructions stored on at least one non-transitory computer readable storage medium for execution by at least one processor via at least one computer readable memory for transmitting a second message to the first computer using the Push or Pull protocol, the second message comprising an update data, the update data retrieved from the address in the first message;
computer program instructions stored on at least one non-transitory computer readable storage medium for execution by at least one processor via at least one computer readable memory for executing in the first computer, one or more of the instructions in the first message with regard to the update data;
computer program instructions stored on at least one non-transitory computer readable storage medium for execution by at least one processor via at least one computer readable memory for updating the address in the first message to match the address of the first computer;
computer program instructions stored on at least one non-transitory computer readable storage medium for execution by at least one processor via at least one computer readable memory for transmitting an updated first message to a further one of the computers; and
computer program instructions stored on at least one non-transitory computer readable storage medium for execution by at least one processor via at least one computer readable memory for repeating transmission of the second message to randomly selected un-updated computers in the plurality of computers, each transmission performed by a most recently updated computer until all of the plurality of computers have been updated, wherein the executing and updating are accomplished by an un-updated computer retrieving the update data from an address in the currently updated first message received from the most recently updated computer; and
computer program instructions stored on at least one non-transitory computer readable storage medium for execution by at least one processor via at least one computer readable memory for, responsive to all computers of the plurality of computers having been updated, returning, by a last computer to be updated, a distribution status document indicating an update status of the plurality of computers to the update source.

18. The system of claim 17 further comprising:
computer program instructions stored on at least one non-transitory computer readable storage medium for execution by at least one processor via at least one computer readable memory for transmitting the first message to the first computer using the Push protocol to transmit the first message from the update source to the first computer; and,
computer program instructions stored on at least one non-transitory computer readable storage medium for execution by at least one processor via at least one computer readable memory for transmitting the second message to the first computer using the Push protocol to transmit the second message comprising data from the address in the first message to the first computer.

19. The system as claimed in claim 17 further comprising: computer program instructions stored on at least one non-transitory computer readable storage medium for execution by at least one processor via at least one computer readable memory for notifying the other computers of a success of transmitting the second message.

20. The system as claimed in claim 17 further comprising:
computer program instructions stored on at least one non-transitory computer readable storage medium for execution by at least one processor via at least one computer readable memory for obtaining the identities of the plurality of computers to be updated; and
computer program instructions stored on at least one non-transitory computer readable storage medium for execution by at least one processor via at least one computer readable memory for partitioning the plurality of computers to be updated into one or more groups of computers according to their physical proximity or network connectivity.

21. The system as claimed in claim 17 further comprising:
computer program instructions stored on at least one non-transitory computer readable storage medium for execution by at least one processor via at least one computer readable memory for switching the update source to a dormant state; and
computer program instructions stored on at least one non-transitory computer readable storage medium for execution by at least one processor via at least one computer readable memory for awakening the update source at intervals to interrogate one of the computers to determine the status of the method.

22. The system as claimed in claim 17 wherein the plurality of computers are located remotely of the update source.

23. The system as claimed in claim 18 wherein a repository identified by the update source is located in a data center.

24. A computer program product comprising:
one or more non-transitory computer readable storage mediums;
computer program instructions stored in at least one non-transitory computer readable storage medium for partitioning, by a management center, a population distribution into a plurality of segments, wherein each segment corresponds with members of a branch office;
computer program instructions stored in at least one non-transitory computer readable storage medium for selecting randomly a first computer in the branch office, wherein the branch office comprises the plurality of computers, the plurality of computers are connected by a local area network, and an update source is connected to the branch office by an Internet connection;
computer program instructions stored in at least one non-transitory computer readable storage medium for creating in the update source, a first message comprising a one or more instructions identifying the plurality of computers in the branch office, and an address of a message repository;
computer program instructions stored in at least one non-transitory computer readable storage medium for transmitting the first message to the first computer using a Push or a Pull protocol;
computer program instructions stored in at least one non-transitory computer readable storage medium for transmitting a second message to the first computer using the Push or Pull protocol, the second message comprising an update data, the update data retrieved from the address in the first message;
computer program instructions stored in at least one non-transitory computer readable storage medium for executing in the first computer, one or more of the instructions in the first message with regard to the update data;
computer program instructions stored in at least one non-transitory computer readable storage medium for updating the address in the first message to match the address of the first computer;
computer program instructions stored in at least one non-transitory computer readable storage medium for transmitting an updated first message to a randomly selected un-updated computer in the plurality of computers, wherein the randomly selected un-updated computer retrieves the update data from the first computer;
computer program instructions stored in at least one non-transitory computer readable storage medium for repeating transmission of the second message to randomly selected un-updated computers in the plurality of computers, each transmission performed by a most recently updated computer until all of the plurality of computers have been updated, wherein the executing and updating are accomplished by an un-updated computer retrieving the update data from an address in the currently updated first message received from the most recently updated computer; and
computer program instructions stored in at least one non-transitory computer readable storage medium for, responsive to all computers of the plurality of computers having been updated, returning, by a last computer to be updated, a distribution status document indicating an update status of the plurality of computers to the update source.

25. The computer program product of claim 24 wherein:
computer program instructions stored in at least one non-transitory computer readable storage medium for transmitting the first message to a first computer using the Push protocol to transmit the first message from the update source to a first one of the computers; and,
computer program instructions stored in at least one non-transitory computer readable storage medium for transmitting the second message to the first computer using the Push protocol to transmit the second message comprising data from the address in the first message to the first computer.

26. The computer program product as claimed in claim 24 further comprising: computer program instructions stored in at least one non-transitory computer readable storage medium for notifying the other computers of the success of transmitting the second message.

27. The computer program product as claimed in claim 24 further comprising:
computer program instructions stored in at least one non-transitory computer readable storage medium for obtaining the identities of the plurality of computers to be updated; and
computer program instructions stored in at least one non-transitory computer readable storage medium for partitioning the plurality of computers to be updated into a one or more groups of computers according to their physical proximity or network connectivity.

* * * * *